Jan. 14, 1969     H. F. PRASSE     3,421,198
METHOD OF MAKING WEAR RESISTANT PISTON RING
Filed Dec. 8, 1965     Sheet _1_ of 2
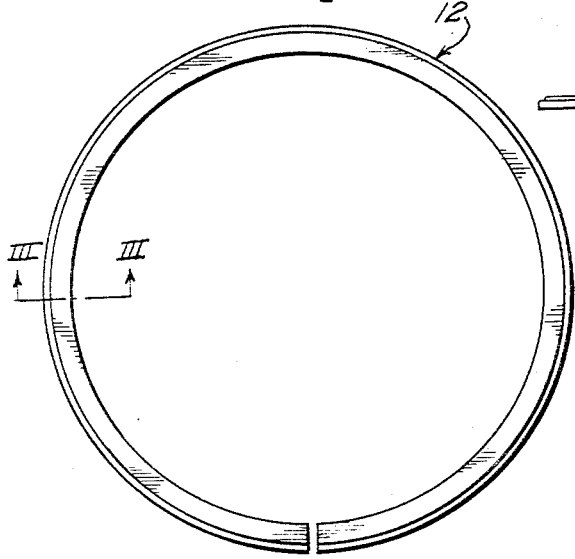
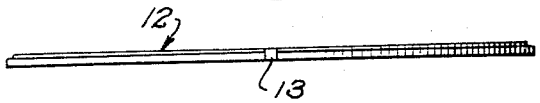
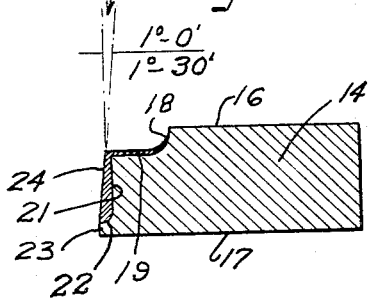
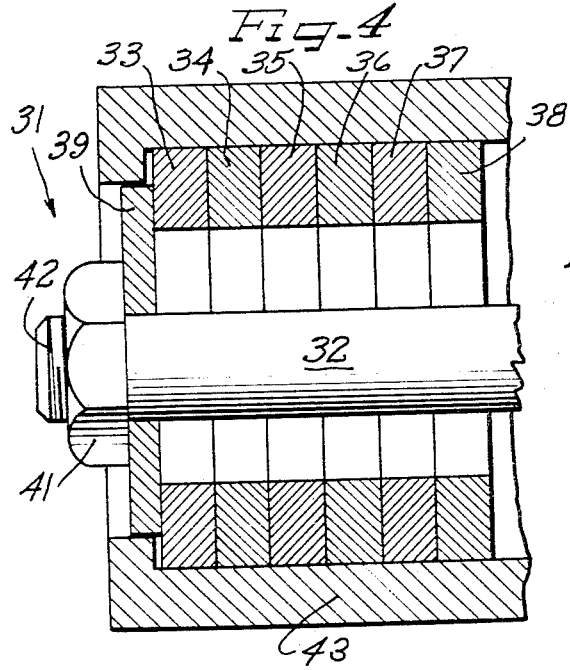
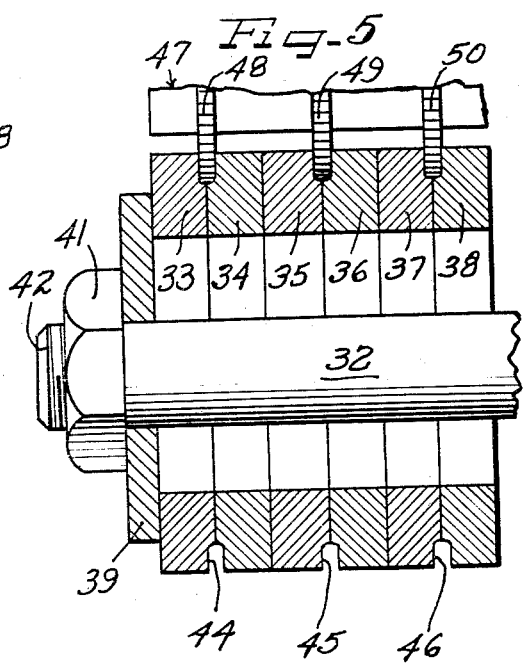
INVENTOR.
Herbert F. Prasse Jan. 14, 1969 H. F. PRASSE 3,421,198
METHOD OF MAKING WEAR RESISTANT PISTON RING
Filed Dec. 8, 1965 Sheet 2 of 2
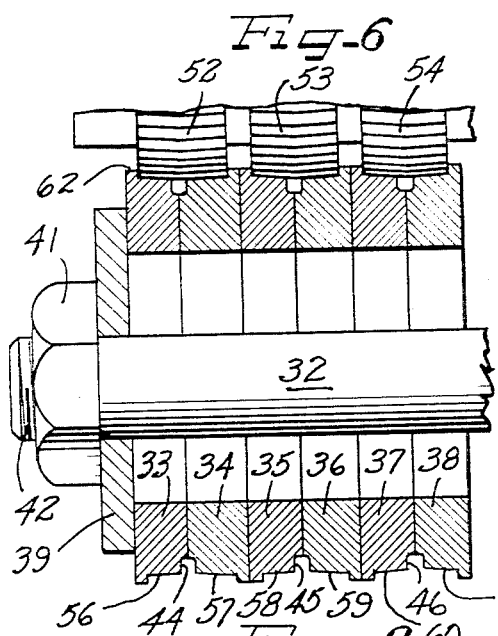
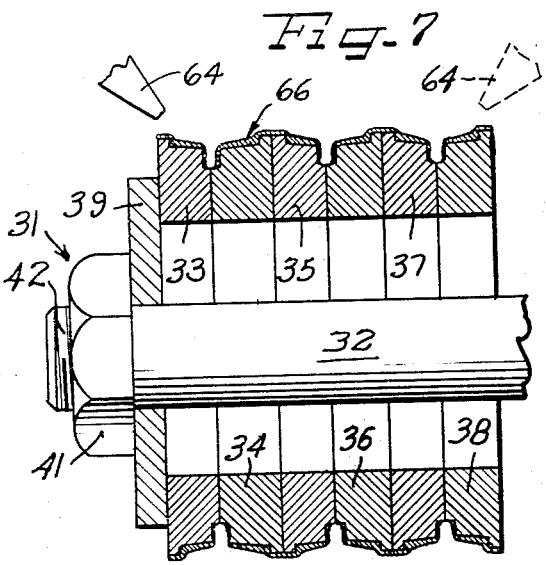
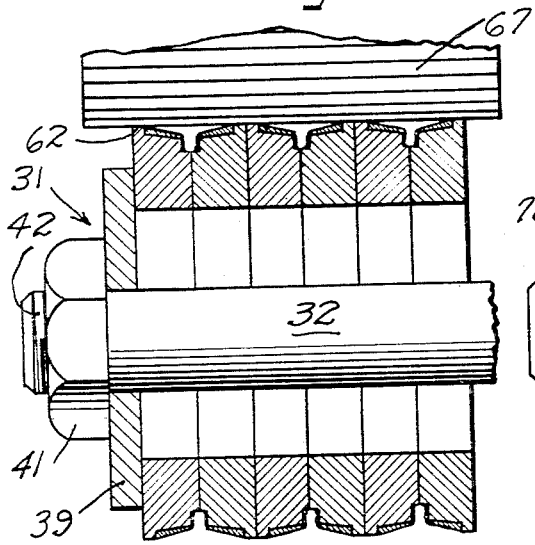
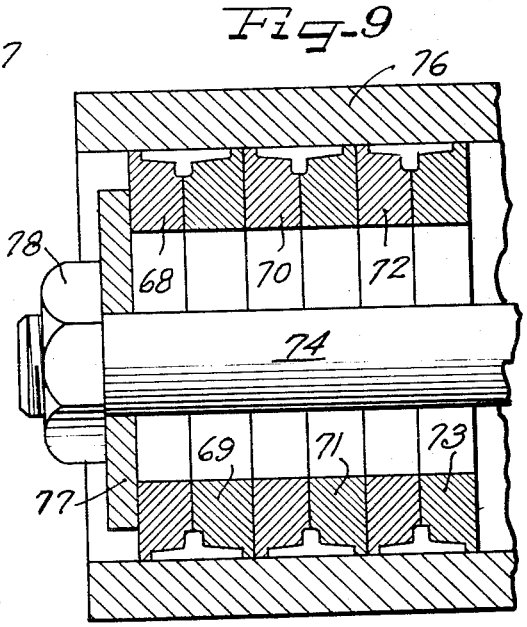
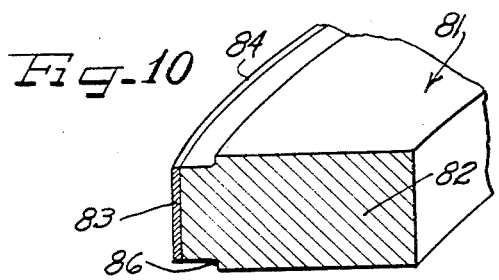
INVENTOR.
Herbert F. Prasse
ATTORNEYS United States Patent Office 3,421,198
Patented Jan. 14, 1969

3,421,198
METHOD OF MAKING WEAR RESISTANT PISTON RING
Herbert F. Prasse, Town and Country, Mo., assignor to Ramsey Corporation, St. Louis, Mo., a corporation of Ohio
Continuation-in-part of application Ser. No. 371,231, May 29, 1964. This application Dec. 8, 1965, Ser. No. 512,347
U.S. Cl. 29—156.6        6 Claims
Int. Cl. B23p 15/06

ABSTRACT OF THE DISCLOSURE

A plurality of piston rings are arranged about a common axis with their radially extending, planar surfaces in abutting relationship. The rings are either pre-grooved or are grooved while in abutting relationship, the groove being between adjacent rings. The assembly is sprayed with a wear-resistant metal at angle sufficient to prevent the sprayed material from reaching the bottom of the groove. Excess wear-resistant metal is removed from the periphery of the rings.

---

This application is a continuation-in-part of my copending application Ser. No. 371,231 filed May 29, 1964, now Patent No. 3,337,938 dated Aug. 29, 1967, and entitled "Piston Ring and Method of Making Same."

The present invention is particularly directed to the manufacture of piston rings of the reverse torsion type consisting of a foundation metal, usually cast iron, and a hard metal coating bonded to the edge of the ring along selected areas thereof. This wear resistant metal, in the preferred embodiment of the invention, consists at least predominantly of molybdenum or tungsten, although other refractory metals having good hot hardness characteristics such as tantalum and osmium can also be used. The foundation metal of the ring provides a wearing-in surface for intial wiping or scraping contact with the wall of the cylinder in which the piston operates. Afterwards, the higher melting point and more resistant material of the coated areas comes into contact with the cylinder wall, thereby prolonging the useful life and service of the compression ring.

In my copending application Ser. No. 371,231 I have described an improved piston ring, and a method for its manufacture involving placing the rings in multiples along an arbor with spacers between the individual pairs of rings. As the rings are rotated, they are grooved to provide upwardly radially inwardly inclined outer peripheral surfaces which are then filled with a higher melting metal.

The present invention provides an improvement over the aforementioned application, particularly in the area of providing the grooves in the rings, and of the subsequent application of the hard metal therein. With the techniques of the present invention, the assembly of the rings on the arbor can be considerably simplified by the elimination of spacer rings, and the amount of grinding required to remove excess hard metal after application in the grooves is significantly reduced.

One of the objects of the present invention is to provide an improved method for simultaneously grooving a plurality of piston rings to produce a configuration of grooves in the rings which are designed for optimum disposition of hard metal therein.

Another object of the invention is to provide an improved method for the manufacture of piston rings faced with a hard metal deposit and providing an improved spraying technique for applying the hard metal to minimize the amount which has to be subsequently removed.

Another object of the invention is to provide a simple and relatively inexpensive method of manufacturing compression rings wherein the same fixturing used for providing the grooves in the edges of the ring is also used for the application of the sprayed on metal.

Still another object of the invention is to provide an improved compression ring having a tapered, multi-function outer peripheral face and having an annular body of such cross-section as to convert the ring into a torsion type of ring in service to thereby effect a better seal between the piston and the cylinder wall.

In general, the method of the present invention involves providing a plurality of rings of a foundation metal, each of the rings having a stepped profile providing shoulders along the edge of varying diameters. Identical rings of this configuration are positioned with their inner lateral surfaces in abutting coaxial alignment, thereby providing a plurality of grooves between the assembled rings. While the rings are rotated, they are sprayed with a molten wear resistant metal directed at an angle to the axis of rotation to thereby deposit the hard metal in preselected areas in the grooves while still permitting the coated rings to be disassembled after the spraying operation.

Other objects and features of the present invention will become apparent to those skilled in the art from the following detailed description of the attached sheet of drawings in which:

FIGURE 1 is a plan view of a split piston ring produced in accordance with the present invention;

FIGURE 2 is a side elevational view of the ring shown in FIGURE 1;

FIGURE 3 is a greatly enlarged and somewhat exaggerated cross-sectional view taken substantially along the line III—III of FIGURE 1, and illustrates the deposit of hard metal along the edges of the ring;

FIGURE 4 is a fragmentary view partly in cross-section and partly in elevation of a fixture in which the rings are mounted in coaxial alignment;

FIGURE 5 is a view similar to FIGURE 4, but illustrating the first cutting operation which provides the grooves existing between the rings at their plane of abutment;

FIGURE 6 is a view similar to FIGURE 5, but illustrating a subsequent grooving operation wherein slightly tapered or straight grooves are provided in addition to the initial grooves shown in FIGURE 5;

FIGURE 7 is a view similar to FIGURE 6, but illustrating rather schematically the metal spraying operation by means of which the edges of the rings are provided with a hard metal coating;

FIGURE 8 illustrates a subsequent grinding operation by means of which the excess metal is removed from the portions of the ring edge at which the foundation metal is to be exposed;

FIGURE 9 is a view partially in elevation and partially in cross-section illustrating a type of fixturing device used for aligning rings which have been pregrooved; and FIGURE 10 is a fragmentary view in perspective, and partially in cross-section, illustrating a modified form of a piston ring which can be made with the process of the present invention.

Before proceeding with a specific description of the drawings, it should be noted that the configurations shown in the drawings are necessarily exaggerated somewhat to show the minute angles, the hard metal coating, and the like more clearly and to accomplish this objective, they must be shown in exaggerated form, as will be apparent to anyone skilled in the art.

As shown in the drawings:

In FIGURE 1, reference numeral 12 has been applied generally to the piston ring of the present invention having a transverse part represented by a gap 13 which decreases to a narrow gap when the ring is installed on the piston. As best seen in FIGURE 3, the ring is composed of a foundation metal body 14 having a stepped edge profile between its upper planar surface 16 and its lower planar surface 17, the designation "upper" and "lower" being in conformity with the position of those surfaces when they are in the groove in the piston and operating against the cylinder wall. The stepped edge profile includes a fillet 18 intersecting the upper planar surface 16 and terminating in a substantially planar annular surface 19. The edge profile of the ring also includes a wall 21 which merges through a fillet 22 with an annular flange portion 23 intersecting the lower planar surface 17. As illustrated in FIGURE 3, the edge profile of the ring except for the annular flange portion 23 and a portion adjoining the upper planar surface 16 has a coating 24 of a hard, wear resistant metal such as molybdenum. The coating may extend up along the surface 19, although it is not necessary that it do so.

As an indication of typical dimensions which can be used in the geometary shown in FIGURE 3, the angle of taper designated at 26 is typically in the range from 1 to 1½°. The thickness of the annular flange portion 23 is measured in thousandths of an inch, typically from 0.0°05 to 0.015 inch. The radial distance from the inner edge of the fillet 18 to the outer periphery of the annular flange portion 23 may be on the order of 0.015 inch or so, while the maximum thickness of deposit of the coating metal 24 is usually less than 0.010 inch and may range from about 0.004 to 0.008 inch.

The initial step in the formation of the rings is shown in FIGURE 4 of the drawings. In that figure, reference numeral 31 indicates generally an arbor assembly comprising a rotatable shaft 32 secured to suitable drive means (not shown). Axially aligned along the shaft 32 are a plurality of plain rings 33 through 38 inclusive in tightly abutting alignment along the shaft 32. An end plate 39 cooperates with a similar end plate on the opposite side (not shown) to apply clamping pressure to the array of rings, the pressure being supplied by means of a nut 41 in threaded engagement with the threaded end 42 on a shaft 32. A split sleeve 43 is positioned about the array of rings 33 to 38 to initially close and stack them in coaxial alignment. When suitable clamping pressure has been applied to the sides of the ring array, the sleeve 43 is removed.

With the rings 33 to 38 aligned as shown in FIGURES 4 and 5, the arbor 31 is rotated, and then grooves 44, 45 and 46 are cut between the abutting planar surfaces of the pairs of rings by means of a cutting tool generally indicated at reference numeral 47 of the drawings. The particular tool shown in the drawings includes a plurality of spaced cutting tools 48, 49 and 50 for convenience, but it will be recognized that a single cutting tool can be used if desired. The medial plane of the cutting tools 48, 49 and 50 intersects the plane of abutment between the abutting rings, 33 and 34, for example, so that the axial extent of the groove on both sides of the plane of abutment is equal.

Next, the edges of the rotating rings 33 to 38 are given a second grooving, to provide the tapered face 21 shown in FIGURE 3 of the drawings. This is accomplished by providing a plurality of spaced cutting tools 52, 53 and 54 which groove the rings to provide slightly tapered wall portions 56, 57, 58, 59, 60 and 61 about the center grooves 44 to 46 inclusive as seen in FIGURE 6. At the same time, the cutting tools leave peripheral lands, one of which is illustrated at reference numeral 62, the lands providing the exposed annular flange 23 of the finished ring as shown in FIGURE 3 of the drawings.

Following the second grooving, the arbor 31 is put on a metal spray lathe for the reception of the hard metal coating in the grooves. This procedure has been somewhat schematically illustrated in FIGURE 7 which illustrates a spray gun 64 directing a spray of molten metal (not shown) at an acute angle to the axis of rotation. The angle referred to is measured in a clockwise direction from the axis of the shaft 32. The spray gun 64 is arranged to reciprocate during the rotation of the arbor 31 for spraying, and at the end of the travel of the spray gun 64 in one direction, the gun 64 is reinclined so that it presents an obtuse spraying angle with respect to the axis of rotation, as illustrated in the dashed line showing of FIGURE 7. With the spray gun at an angle to the grooves, rather than normal to the axis of the surface, the sprayed metal will not be projected to a substantial extent into the grooves 44, 45 and 46. The adjacent ring in each case shields the parting surface between the two adjacent rings so that little or no sprayed metal appears at the parting line between the adjacent rings. Alternatively, two spray guns can be used simultaneously, both at an angle to the axis of the arbor, provided their spray patterns do not intersect.

The operation of the spray gun 64 serves to provide a relatively thin hard metal coating generally identified at reference numeral 66 in the drawings. The coating will be somewhat thicker at the slightly tapered wall portions 56, 57, etc. and diminishes to substantially nothing at the base of the grooves 44, 45, etc.

The next operation is a grinding operation performed by a grinding wheel 67 to remove any hard metal coating which has become deposited on the peripheral lands 62. This step is illustrated in FIGURE 8 of the drawings. Upon completion of this grinding operation, the individual rings may be removed from the arbor 31. Usually, further, finishing operations are not necessary except possibly in certain applications where it may be desirable to lap the outer diameter surface for quick seating in the engine.

While the use of the same fixture for grooving and spraying forms the preferred embodiment of the present invention, it is also possible to perform the spraying on rings which have been individually grooved. A suitable assembly is illustrated in FIGURE 9, where the pre-grooved rings are identified at reference numeral 68 through 73, the rings being mounted coaxially with a shaft 74 by means of a centering sleeve 76. Axial pressure to the array of rings is provided by means of a plate 77, and a nut 78 which is threadedly engaged on the threaded end of the shaft 74. Upon initial alignment of the pre-grooved rings, the sleeve 76 is removed and then the spraying operation is carried out as shown in FIGURE 7 of the drawings.

It is not always necessary that the second grooving operation depicted in FIGURE 6 provide a tapered wall for the edge profile. Actually, with no angle at all on this groove, there will still be a slight taper in the wall as illustrated in FIGURE 3 of the drawings due to natural flow of the metal and a tendency to build up more on one side of the groove than on the other.

A straight faced type of configuration can be made by the process of the present invention as illustrated in FIGURE 10. There, reference numeral 81 indicates generally a piston ring composed of a foundation metal 82 having a substantially uniform thickness coating layer 83 of a hard metal therealong. A pair of grooves 84 and 86 are provided at opposite ends of the coated area. This type of structure can be made by inclining the spray gun 64 as mentioned previously to prevent direct impingement of the molten metal at the abutting face of the individual rings when the rings are coaxially aligned.

From the foregoing, it will be understood that the method of the present invention provides a simple but highly effective means for applying a hard metal coating on selected areas of a piston ring profile. The process is carried out with a minimum of fixtures, and with the necessity of less grinding to remove excess sprayed metal than processes heretofore employed for this purpose.

It should be evident that various modifications can be made to the described embodiments without departing from the scope of the present invention.

I claim as my invention:

1. The method of making piston rings, which comprises:
providing a plurality of rings each having a pair of radially extending planar surfaces, one of said surfaces of each ring being of less diameter than the other and the periphery between said surfaces being of a stepped profile forming a first groove portion adjacent the surface of less diameter, an annular ungrooved edge portion adjacent said other surface and an intermediate groove portion joining said first groove portion and said edge portion,
assembling said rings about a common axis with said planar surfaces in abutting contact and with said stepped profiles of a pair of abutting rings forming a composite groove symmetrical about and including the plane of abutment between the rings of said pair, rotating said rings while so assembled, and
spraying a wear-resistant metal against the peripheries of said rings at such an angle to the common axis in relation to the configuration of said composite groove that substantially none of said sprayed metal is deposited on the radially inner surfaces of said composite groove that include said common plane of abutment while said ungrooved edge portions are coated with said wear-resistant metal.

2. The method of claim 1 in which said wear-resistant metal consists of molybdenum and alloys thereof.

3. The method of claim 1 in which said wear-resistant metal consists of tungsten and alloys thereof.

4. In a method of making piston rings having a peripheral facing of a wear-resistant metal, said rings having ungrooved peripheral portions and having complementary annular peripheral groove portions forming a composite groove between each pair of rings when said rings are assembled about a common axis with opposed radially extending planar surfaces in full surface contact at the plane of abutment; the steps of
rotating said rings when so assembled, and spraying a coating of a wear-resistant metal toward the peripheral surfaces of said rings at an angle thereto such that in combination with the depth and configuration of said composite groove substantially none of said sprayed metal is deposited at and across the plane of abutment at its intersection with the radially innermost surface of said composite groove.

5. The method as defined by claim 4, wherein said spraying is carried out by reciprocating the movement of such spraying axially of said assembled rings, and
removing any excess of wear-resistant metal deposited on ungrooved peripheral portions of said rings while leaving a facing thereon of said wear-resistant metal.

6. In the method of making piston rings of claim 4, wherein the assembly of grooved rings is formed by the steps of assembling at least a pair of identical metal rings of a foundation metal about a common axis with adjacent radially extending planar surfaces of said rings in abutting relationship, rotating said rings about said axis, and grooving the edges of said rings at their abutting faces to provide a relatively deep groove of equiaxial extent at both sides of the plane of abutment and an additional groove of lesser depth than said relatively deep groove immediately adjacent thereto, leaving an ungrooved peripheral edge portion remote from said plane of abutment.

References Cited

UNITED STATES PATENTS 2,905,512   9/1959   Anderson ---------- 29—156.6
2,919,486   1/1960   Banguarel ---------- 29—156.6

JOHN F. CAMPBELL, *Primary Examiner.*

U.S. Cl. X.R.

29—527